United States Patent
Yang et al.

(10) Patent No.: US 11,501,319 B2
(45) Date of Patent: Nov. 15, 2022

(54) CONTROL POINT COMPLIANCE PREDICTION BASED ON REGULATION IN MULTI-MEDIA

(71) Applicant: International Business Machines Corporation, Armonk, NY (US)

(72) Inventors: Bo Yang, Beijing (CN); Anca Sailer, Scarsdale, NY (US); Priya A Ashok Nagpurkar, Ossining, NY (US); Malgorzata Steinder, Leonia, NJ (US); Zhong Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/082,574

(22) Filed: Oct. 28, 2020

(65) Prior Publication Data

US 2022/0129913 A1    Apr. 28, 2022

(51) Int. Cl.
| | |
|---|---|
| G06Q 30/00 | (2012.01) |
| G06Q 30/02 | (2012.01) |
| G06Q 50/00 | (2012.01) |
| G06Q 10/10 | (2012.01) |
| G06Q 50/26 | (2012.01) |
| G06F 16/483 | (2019.01) |
| G06F 16/487 | (2019.01) |
| G06N 20/00 | (2019.01) |
| G06F 16/951 | (2019.01) |
| G06F 40/205 | (2020.01) |
| G06F 40/30 | (2020.01) |
| G06V 20/00 | (2022.01) |

(52) U.S. Cl.
CPC ....... *G06Q 30/0185* (2013.01); *G06F 16/483* (2019.01); *G06F 16/487* (2019.01); *G06F 16/951* (2019.01); *G06N 20/00* (2019.01); *G06Q 10/105* (2013.01); *G06Q 30/0205* (2013.01); *G06Q 50/01* (2013.01); *G06Q 50/265* (2013.01); *G06F 40/205* (2020.01); *G06F 40/30* (2020.01); *G06Q 30/0203* (2013.01); *G06V 20/00* (2022.01); *G06V 2201/10* (2022.01)

(58) Field of Classification Search
CPC ............ G06Q 30/0185; G06Q 30/0205; G06F 16/487; G06F 16/483
See application file for complete search history.

(56) References Cited

U.S. PATENT DOCUMENTS

11,025,634 B2 * 6/2021 Balasubramanian ........................ H04L 63/102
2003/0231857 A1 12/2003 Green
2006/0089837 A1 4/2006 Adar
(Continued)

*Primary Examiner* — Meredith A Long
(74) *Attorney, Agent, or Firm* — VanLeeuwen & VanLeeuwen; Jeffrey S. LaBaw (57) ABSTRACT

An approach is provided that receives multimedia content and extracts a set of metadata from the content. The extraction of metadata includes performing image analysis on the multimedia content. The approach then analyzes the set of metadata with the analysis resulting in a set of regulations that apply to the multimedia content. The approach compares the set of metadata to the set of regulations and allows publication of the multimedia content when the comparison reveals that the multimedia content is in compliance with the set of regulations, and inhibits publication of the multimedia content when the multimedia content fails to comply with the set of regulations.

9 Claims, 6 Drawing Sheets

(56) References Cited

U.S. PATENT DOCUMENTS

| | | | |
|---|---|---|---|
| 2018/0063147 A1* | 3/2018 | Chalmandrier-Perna | ..................... H04L 63/20 |
| 2018/0152763 A1* | 5/2018 | Barlaskar | ........... H04N 21/4668 |
| 2018/0189797 A1 | 7/2018 | Ravi | |
| 2018/0365250 A1* | 12/2018 | Maharajh | .............. G06F 16/957 |
| 2021/0174089 A1* | 6/2021 | Rao | ........................ G06V 20/62 |

* cited by examiner

CONTROL POINT COMPLIANCE PREDICTION BASED ON REGULATION IN MULTI-MEDIA

BACKGROUND

Organizations, such as businesses, government entities, and the like, continually monitor current political developments regarding regulations that may affect the organizations and how they conduct business.

New changes that arise to such regulations may cause the organization to change policies, sales strategies, and standard operating procedures (SOP).

In addition, new privacy regulations as well as privacy policies enacted by the organization need to be followed so that the organization does not face sanctions, penalties, and negative press for violating such regulations and policies.

Activities that are performed by employees and vendors on behalf of the organization can include multi-media activities posted to online websites, such as social media sites, the organization's websites, and other websites of interest to the organization.

SUMMARY

An approach is provided that receives multimedia content and extracts a set of metadata from the content. The extraction of metadata includes performing image analysis on the multimedia content. The approach then analyzes the set of metadata with the analysis resulting in a set of regulations that apply to the multimedia content. The approach compares the set of metadata to the set of regulations and allows publication of the multimedia content when the comparison reveals that the multimedia content is in compliance with the set of regulations, and inhibits publication of the multimedia content when the multimedia content fails to comply with the set of regulations.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

FIGS. 1-6 describe an approach that provides control point compliance predictions based on regulations that are related to data discerned from multimedia sources. An extractor component crawls and extracts multimedia content, such as from news websites, social media websites, and the like. An access analyzer component is used to analyze the platform configurations that are related to potentially impacted locations and people. A policy classifier is a component that is trained using machine learning to detect the classification of regulations that are related to the impacted multimedia content found by the access analyzer.

A multimedia content author/provider component identifies the compliance properties associated with the person providing the multimedia that is intended to be published. The person can be tied to a location and a role, or responsibility, to ascertain the various types of rules and regulations that may possibly be impacted. For example, an officer of a company may be subject to more regulations than a lower level employee.

An audience detection component is used to identify the potential audience of the requested multimedia posting. The audience can be used to detect the radius of potential impact of the multimedia posting. For example, a narrow, regional posting would likely have different (local) regulations for compliance than a nationwide or global audience which may have multiple regulations for compliance due to the multiple locations being impacted. To identify the various regulations at issue, a location-based compliance detector component detects, or identifies, the regulations that are currently in place at the locations identified by the audience detector component.

A two-fold approach is provided for media compliance mapping. First, mapping is provided between the provider of the multimedia message and the audience locality to determine the radius of the regulations impacted. Second, mapping is provided between the provider of the multimedia message and the regulations potentially impacted by the audience and the provider. Based on the analysis of the multimedia request and a comparison to applicable (predicted) regulations that may be impacted, the approach determines whether to allow the posting of the multimedia or to disallow the posting. If the posting is disallowed, further analysis may be performed as well as information gathering, such as a discussion with the individual provider, to ascertain whether the multimedia posting would impact applicable rules and regulations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
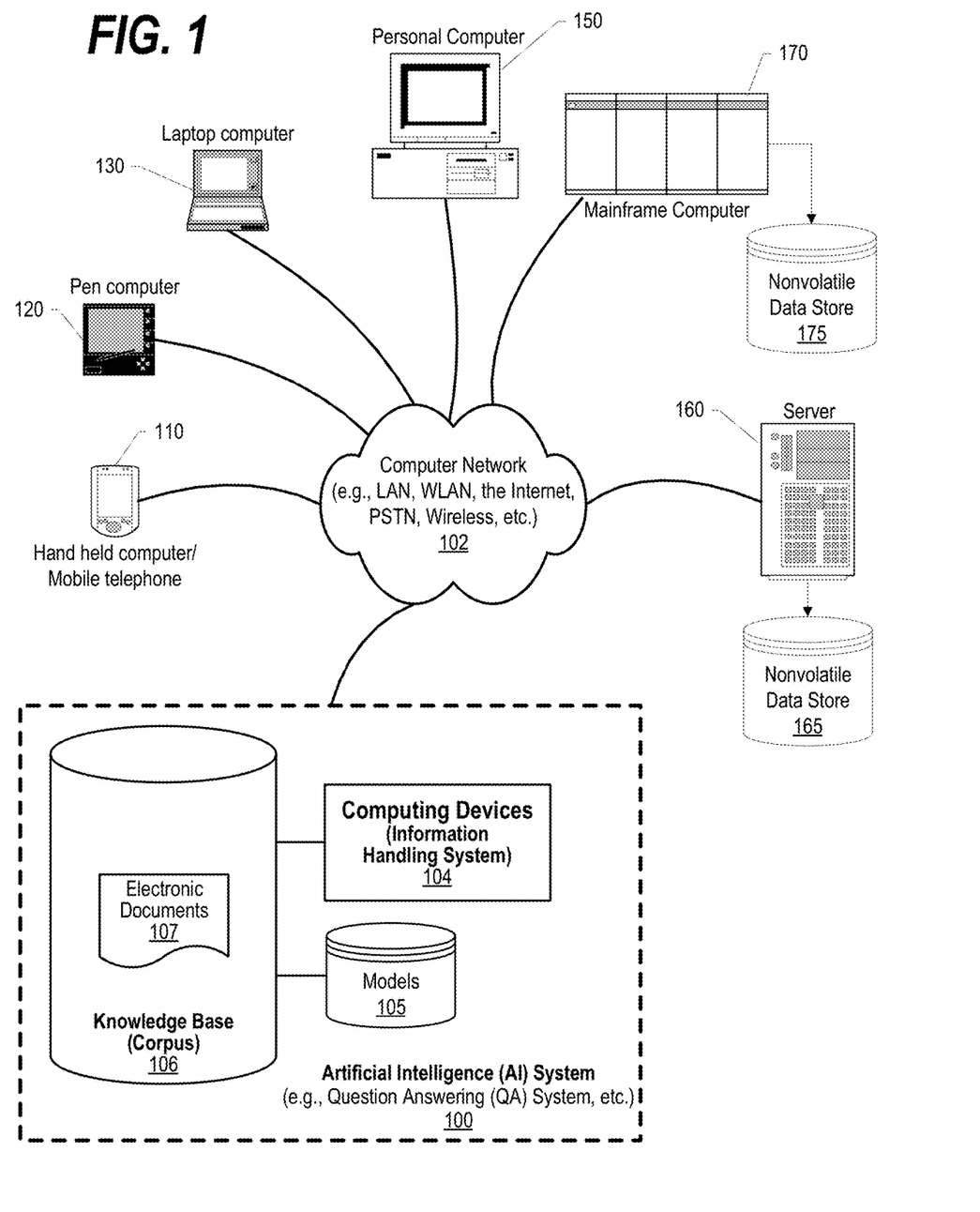
FIG. 1 depicts a network environment that includes a knowledge manager that utilizes a knowledge base.

FIG. 1 depicts a schematic diagram of one illustrative embodiment of an artificial intelligence (AI) system 100 in a computer network 102. AI system 100 may include a knowledge manager computing device 104 (comprising one or more processors and one or more memories, and potentially any other computing device elements generally known in the art including buses, storage devices, communication interfaces, and the like) that connects AI system 100 to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. AI system 100 and network 102 may enable question/answer (QA) generation functionality for one or more content users or processes. Other embodiments of AI system 100 may be used with components, systems, sub-systems, and/or devices other than those that are depicted herein.

AI system 100 may be configured to receive inputs from various sources. For example, AI system 100 may receive input from the network 102, a corpus of electronic documents 107 or other data, a content creator, content users, and other possible sources of input. In one embodiment, some or all of the inputs to AI system 100 may be routed through the network 102. The various computing devices on the network 102 may include access points for content creators and content users. Some of the computing devices may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in electronic documents 107 for use as part of a corpus of data with AI system 100. Electronic documents 107 may include any file, text, article, or source of data for use in AI system 100. Content users may access AI system 100 via a network connection or an Internet connection to the network 102, and may input questions to AI system 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. Semantic data 108 is stored as part of the knowledge base 106. In one embodiment, the process sends well-formed questions (e.g., natural language questions, etc.) to the knowledge manager. AI system 100 may interpret the question and provide a response to the content user containing one or more answers to the question. In some embodiments, AI system 100 may provide a response to users in a ranked list of answers.

In some illustrative embodiments, AI system 100 may be the IBM Watson™ system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ system. The statistical model may then be used to summarize a level of confidence that the IBM Watson™ system has regarding the evidence that the potential response, i.e. candidate answer, is inferred by the question. This process may be repeated for each of the candidate answers until the IBM Watson™ system identifies candidate answers that surface as being significantly stronger than others and thus, generates a final answer, or ranked set of answers, for the input question.

Types of information handling systems that can utilize AI system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
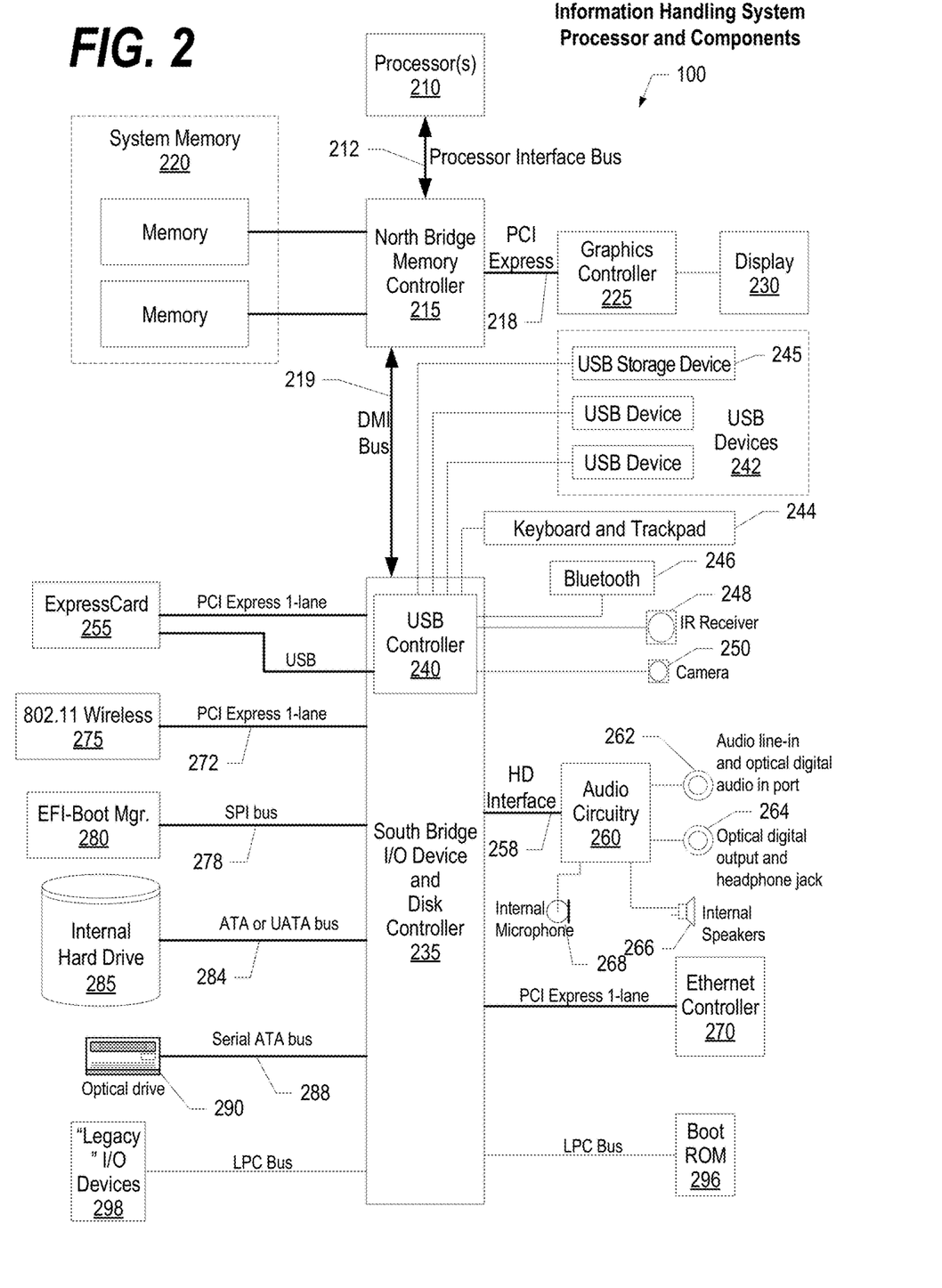
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE .802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
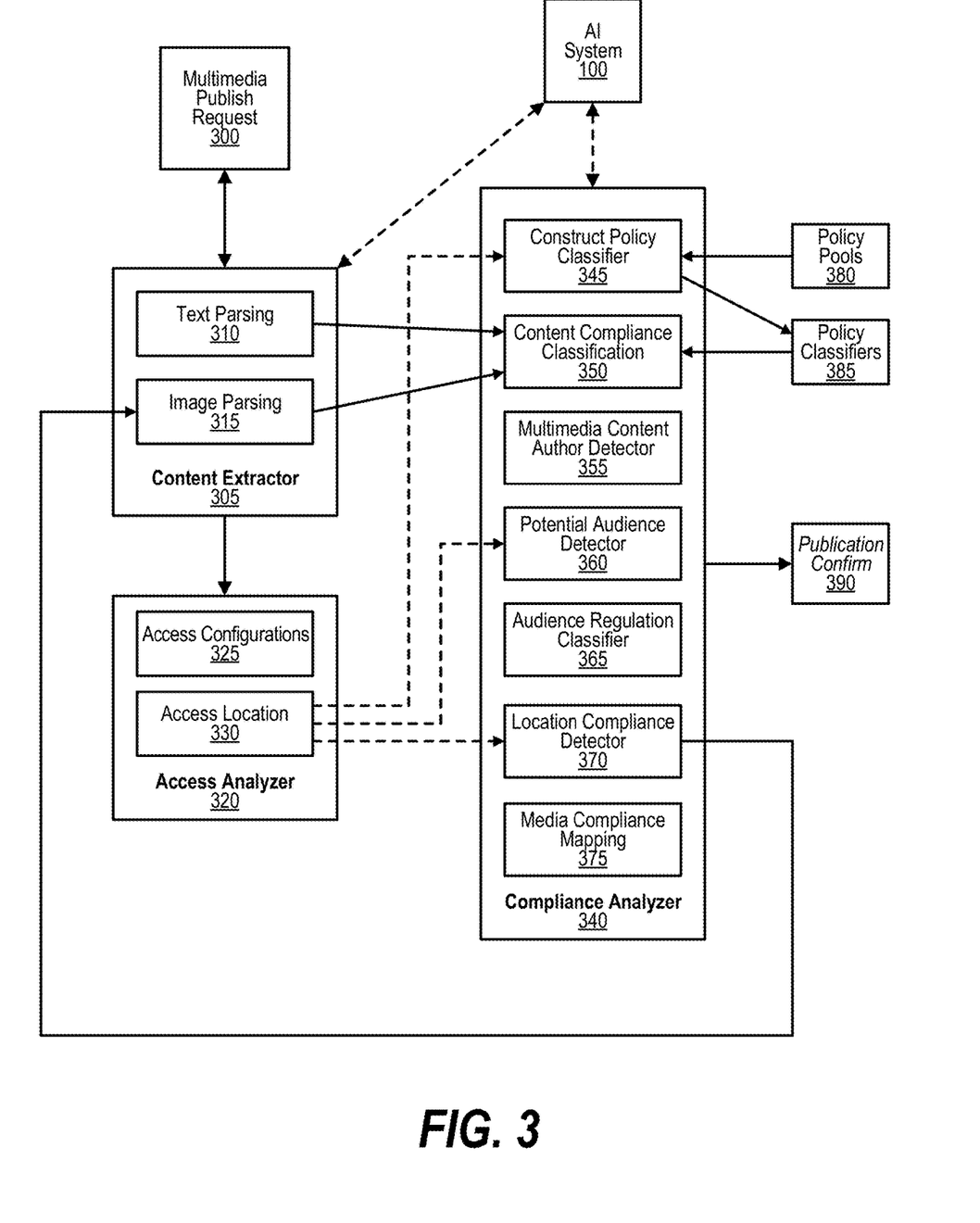
FIG. 3 is a component diagram that shows the various components included in a system that performs compliance predictions based on a multimedia publication request.

FIG. 3 is a component diagram that shows the various components included in a system that performs compliance predictions based on a multimedia publication request. Multimedia publication request 300 is received with the request being to publish multimedia content. Before the multimedia content is published, however, the system shown analyzes the multimedia content to determine whether the multimedia content confirms with applicable rules, policies, laws, regulations, etc. (collectively, and individually, referred to herein, as "regulations").

Content extractor 305 includes at least two functional processes. Each of these functional processes may utilize trained AI system 100 to identify and extract data from the multimedia content. First, text parsing process 310 parses, or extracts, any available text from the multimedia content as well as any additional text that was provided in the request (e.g., a requestor's user identifier that might also be the a provider, such as the author, person that created the multimedia content, etc.). In addition, if the multimedia content includes audio, then process 310 converts any speech found in the audio to text. The text extracted by process 310 is stored as a set of metadata that assists in describing the multimedia content.

Content extractor 305 also includes image parsing process 315 that performs an image analysis on the multimedia content. In one embodiment, the image analysis process uses a trained artificial intelligence (AI) system to identify specific images found in the multimedia content. For example, a particular building, bridge, landmark, or other item appearing in the multimedia content can be compared to items previously learned by the AI system. For example, a particular building that appears in the multimedia content may be found to be a building in Paris, France. Image parsing gathers metadata from the multimedia content using the AI system and adds the gathered metadata to the set of metadata identified during the text processing performed by process 310.

Access analyzer 320 uses the parsed data extracted by content extractor 305 as inputs to two processes. Access configurations process 325 identifies platform configurations related to the audience group properties who can access (e.g., ",white list," etc.) or cannot access (e.g., "black list," etc.) the multimedia content on the publication platform (e.g., identified by user group, role, IP address, etc.). Access location process 330 identifies various locations (e.g., geographic locations, cities, nations, etc.) that multimedia content hosted on may be impacted by the local regulation control (e.g. GDPR for Europe, HIPAA for US, etc.). The access locations are determined based on the (multimedia publication) platform configuration and properties (e.g. where the service code running, where the database locating etc.).

Compliance analyzer 340 includes a number of component processes used to predict whether the multimedia content is in compliance with applicable regulations. Various components of compliance analyzer 340 may utilize trained AI system 100 to detect and classify data found in the multimedia content. Construct policy classifier process 345 ingests, or learns, of regulations and classifies these regulations based on the parsing that was performed by the content extractor (e.g., based on geography, city, state, national regulations, company policies, industry policies, etc.). Process 345 receives regulations from policy pools 380, such as data sources available over the Internet. The classified regulations are stored as policy classifiers 385.

Content compliance classification process 350 takes regulations that have been classified from policy classifiers 385 and matches them to the metadata found by the parsing of the multimedia content by content extractor process 305. This sets a field of possible regulations that may be at issue depending upon the author, audience and specific location detections made by other processes in compliance analyzer 340.

Multimedia content author detector process 355 uses parsed multimedia content data as well as additional data that may have been received when the content was received in order to identify the author, or provider, of the multimedia content. The content may have author, artist, or provider indicia embedded in the multimedia content with this information either appearing in the content, spoken in the content, or part of hidden data included in the content. In addition, the user identifier of the requestor making the multimedia content request 300 can also be analyzed to help detect the author of the content. As used herein, the provider, author, artist, creator, or the like is referred to as the "author" of the multimedia content.

Potential audience detector process 360 detects the intended audience of the multimedia content based on metadata gathered during the analysis of the multimedia content text and images performed by content extractor process 305. For example, a multimedia content may indicate in some form the intended audience, such as a conference, or the type of people that are intended to view the content (e.g., multimedia content directed to doctors, investors, engineers, lawmakers, etc.).

Audience regulation classifier process 365 takes the potential audience detected by process 360 and identifies, or classifies, particular regulations that are used for such an audience. For example, multimedia content directed to potential investors is often regulated by securities laws as well as by insider trading regulations.

Location compliance detector process takes the access location data identified through location analysis of the multimedia content hosted on/running on and compares regulations applicable to such a location (e.g., city, business location, state/province, nation, etc.). For example, a locality may have regulations prohibiting multimedia content from a particular location due to sensitivity, confidentiality, or other reason applying to such particular location.

Media compliance mapping process 375 takes a hybrid approach to compare the set of metadata corresponding to the multimedia content, such as author regulations, potential audience regulations, and location regulations, to determine whether the multimedia content that was included in request 300 complies with all such regulations. A hybrid approach means a particular regulation might be found that apply to a particular author or audience at a particular location, even though such regulation might not apply to the author or audience at a different location.

Based upon the analysis of the multimedia content and the comparison of the set of metadata that is generated corresponding to the multimedia content and applicable regulations, compliance analyzer 340 ultimately determines whether the multimedia content is in compliance with applicable regulations or violates one or more regulations. Publication confirmation 390 is generated by compliance analyzer 340 when the analyzer determines that the multimedia content complies with applicable regulations. On the other hand, if the multimedia content fails to comply with one or more applicable regulations, then the process inhibits publication of the multimedia content (e.g., denies posting of content to website, etc.).

Figure 4:
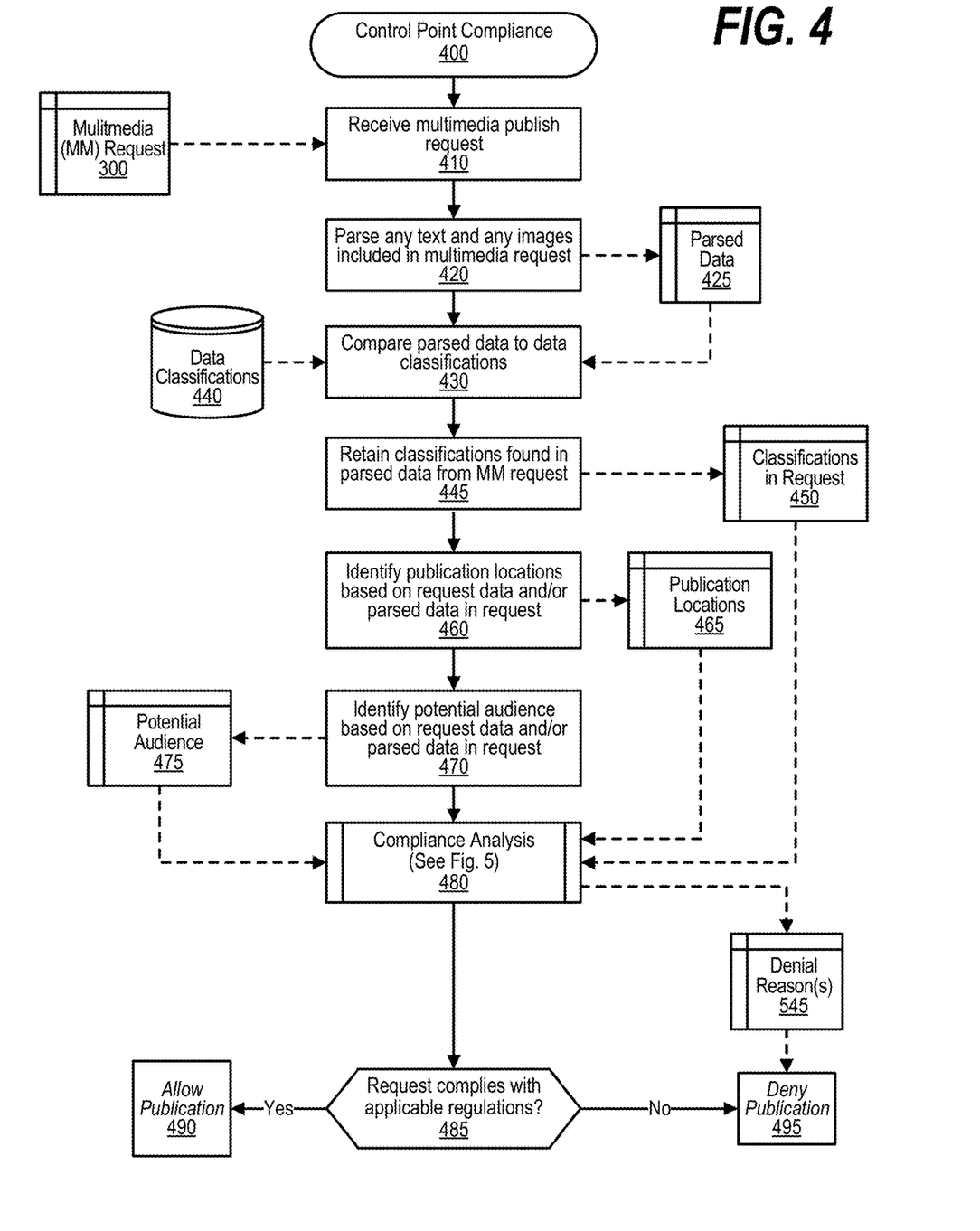
FIG. 4 is a depiction of a flowchart showing the logic used to in control point compliance operations.

FIG. 4 is a depiction of a flowchart showing the logic used to in control point compliance operations. FIG. 4 processing commences at 400 and shows the steps taken by a process that performs a control point compliance on multimedia content and analyzes the multimedia content against applicable regulations. At step 410, the process receives multimedia publish request 300 from a requestor, such as a content provider. The requestor can be an individual user or the requestor can be a process that submits the multimedia content.

At step 420, the process parses any text and any images included in multimedia request. Text might appear as text in a video or can also be text included as metadata to the multimedia, such as a title of the multimedia content. Images are frames of the multimedia content that can be further separated into distinct images, or shapes, such as a particular building or landmark, that appears in a frame of the multimedia content. The parsed data, both textual and images, are stored in memory area 425.

At step 430, the process compares the parsed data stored in memory area 425 to data classifications retained in data store 440. In one embodiment, data classifications are ingested, or learned, by the AI system with the AI system being used to compare the parsed data to textual data and image data previously ingested, or learned, by the AI system. At step 445, the process retains the classifications found in step 430 in memory area 450. These classifications will be used during the compliance analysis process.

At step 460, the process identifies predicted publication locations based on data included in the multimedia request as well as from the parsed data previously identified from the multimedia content by the process. The predicted publication locations are then stored in memory area 465. At step 470, the process identifies a potential audience with the potential audience being based on data included in the multimedia request as well as from the parsed data previously identified from the multimedia content by the process. The potential audience is stored in memory area 475.

Figure 5:
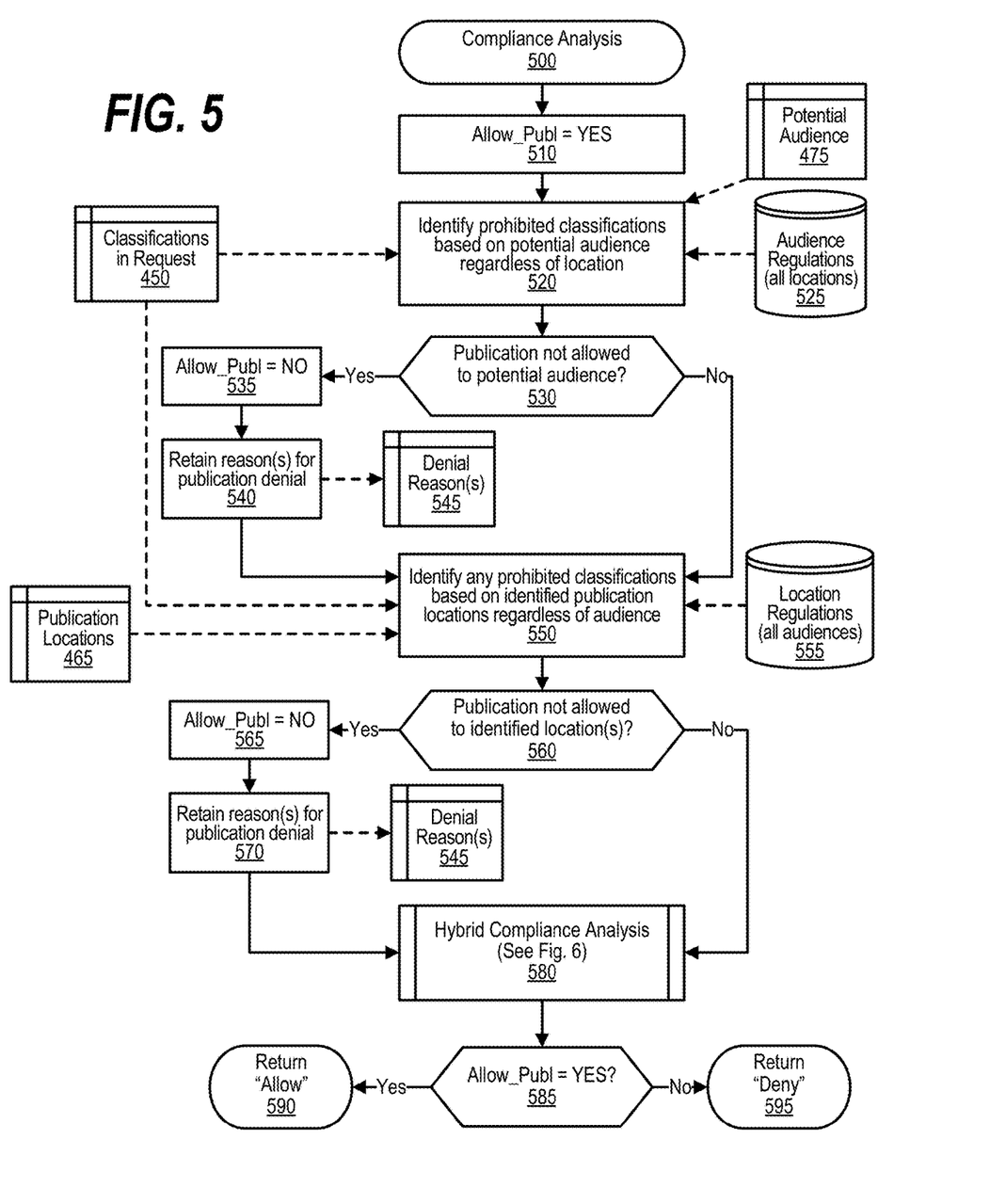
FIG. 5 is a depiction of a flowchart showing the logic used during compliance analysis of a parsed multimedia publication request.

At predefined process 480, the process performs the Compliance Analysis routine (see FIG. 5 and corresponding text for processing details). This routine takes the classifications found in the request (from memory area 450), the predicted publication locations (from memory area 465), and the predicted audience (from memory area 475) and compares the metadata found in the multimedia request to applicable regulations. If, based on the analysis, the request is denied, then, in one embodiment, the process writes denial reasons to memory area 545 so that the requestor can be informed as to why the multimedia publish request was denied.

The process determines as to whether the multimedia publication request complies with applicable regulations (decision 485). If the request complies with applicable regulations, then decision 485 branches to the 'yes' branch, whereupon, at step 490, the publication request is allowed and the multimedia content is published on the network-accessible area (website, etc.) being controlled by the process. On the other hand, if the request does not comply with applicable regulations, then decision 485 branches to the 'no' branch whereupon, at step 495, the request is denied and, if available, denial reasons are provided to the requestor from memory area 545.

FIG. 5 is a depiction of a flowchart showing the logic used during compliance analysis of a parsed multimedia publication request. FIG. 5 processing commences at 500 and shows the steps taken by a process that performs a Compliance Analysis routine. This routine is called by the processing shown in FIG. 4. At step 510, the process initializes a Boolean variable (allow_Publs) to 'YES' or 'TRUE' indicating that no reasons to inhibit publication of the multimedia content have been found so far by the compliance analysis routine. At step 520, the process identifies the prohibited classifications based on potential audience regardless of location. The potential audience is retrieved from memory area 475, the classifications found in the multimedia content are retrieved from memory area 450, and the audience-based regulation are retrieved from data store 525.

The process determines as to whether the publication of the multimedia content is not allowed to the potential audience due to applicable regulations (decision 530). If the publication of the multimedia content is not allowed to the potential audience due to applicable regulations, then decision 530 branches to the 'yes' branch whereupon steps 535 and 540 are performed. On the other hand, if the publication of the multimedia content is allowed to the potential audience and does not violate applicable regulations, then decision 530 branches to the 'no' branch bypassing steps 535 and 540.

Steps 535 and 540 are performed when the request is denied because the multimedia content is prohibited from the potential audience by one or more regulations. At step 535, the process sets the Boolean variable (allow_Publs) to 'NO' or 'FALSE,' indicating that the multimedia publication request will be denied, or inhibited. At step 540, the process retains the reason(s) for the publication denial, such as a solicitation to potential investors is not allowed, perhaps due to organizational rules (regulations) that control the type of contact between the organization and investors. The denial reasons are retained in memory area 545.

At step 550, the process identifies any prohibited classifications based on identified potential publication locations regardless of the potential audience. The potential locations are retrieved from memory area 465, the classifications are retrieved from memory area 450, and the applicable location-based regulations are retrieved from data store 555. The process determines as to whether the publication not allowed to the identified potential location(s) due to one or more regulations (decision 560). If the publication not allowed to the identified location(s) due to one or more regulations, then decision 560 branches to the 'yes' branch to perform steps 565 and 570. On the other hand, if publication to the identified potential location(s) does not violate any location-based regulations, then decision 560 branches to the 'no' branch bypassing steps 565 and 570.

Steps 565 and 570 are performed when the request is denied because the multimedia content is not allowed to at least one of the potential locations. For example, one of the potential locations may prohibit solicitations of this type (e.g., tobacco advertisements, etc.). At step 565, the process sets the Boolean variable (allow_Publs) to 'NO' or 'FALSE' indicating that the multimedia publication request will be denied, or inhibited. At step 570, the process retains the reason(s) for the publication denial, such as an advertisement of this type are not allowed at a particular potential location. The denial reasons are retained in memory area 545.

Figure 6:
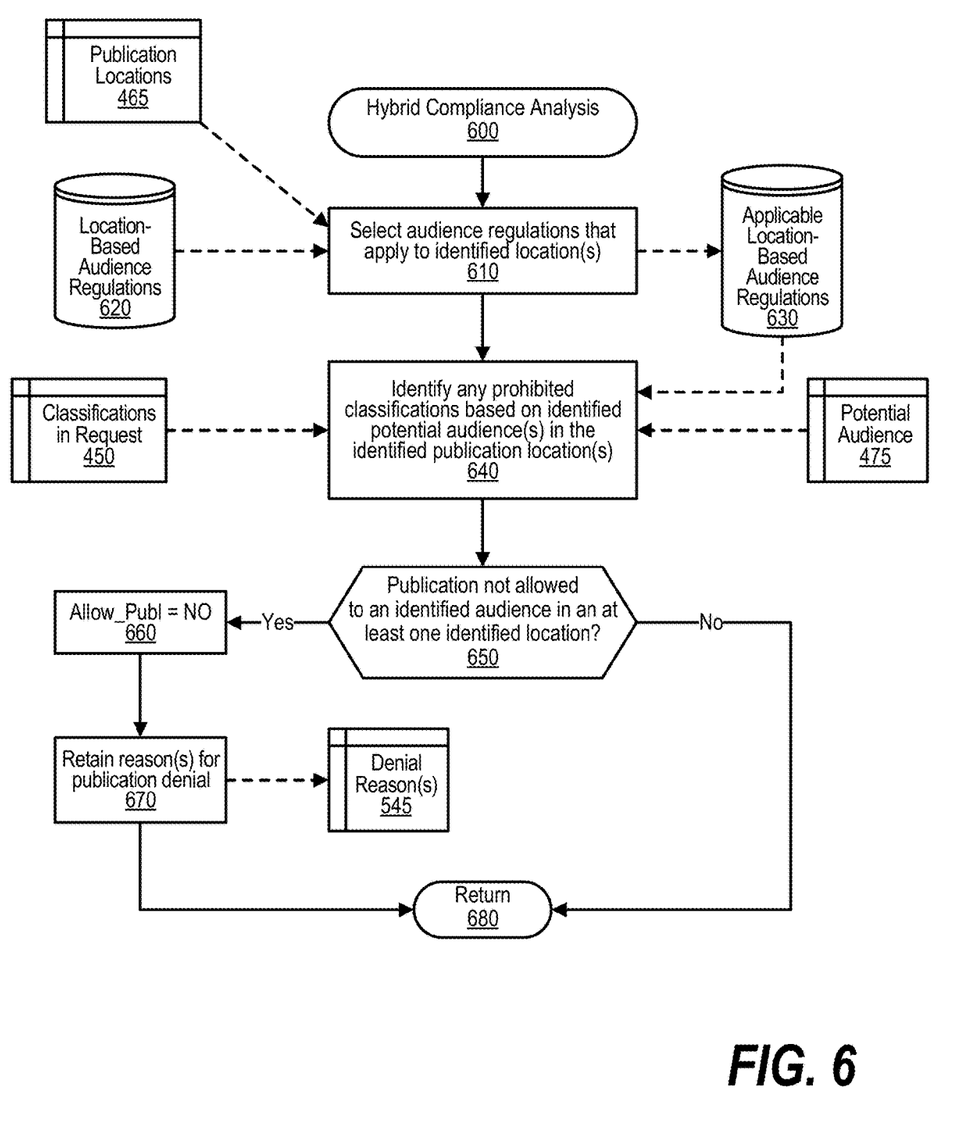
FIG. 6 is a depiction of a flowchart showing the logic used in a hybrid compliance analysis that functions as part of the overall compliance analysis of the parsed multimedia publication request.

At predefined process 580, the process performs the Hybrid Compliance Analysis routine (see FIG. 6 and corresponding text for processing details). The hybrid analysis combines aspects of the potential audience and the potential location to further identify applicable regulations. The process determines as to whether the compliance analysis determined that the multimedia content publication request should be allowed (decision 585). If the multimedia content publication request should be allowed, then decision 585 branches to the 'yes' branch, whereupon returns to the calling routine (see FIG. 4) with a return code indicating that the request should be allowed. On the other hand, the multimedia content publication request should be denied, then decision 585 branches to the 'no' branch whereupon processing returns to the calling routine (see FIG. 4) with a return code indicating that the request should be denied (inhibited).

FIG. 6 is a depiction of a flowchart showing the logic used in a hybrid compliance analysis that functions as part of the overall compliance analysis of the parsed multimedia publication request. FIG. 6 processing commences at 600 and shows the steps taken by a process that a Hybrid Compliance Analysis. This routine is called by FIG. 5 which performs the overall compliance analysis.

At step 610, the process selects audience regulations from data store 620 that apply to the identified potential location(s) stored in memory area 465. Any applicable location-based audience regulations are then stored in data store 630. At step 640, the process identifies any prohibited classifications, retrieved from memory area 450, based on the identified potential audience(s) that were stored in memory area 475 and the identified publication location(s) stored in data store 630. For example, one location might prohibit a certain type of solicitation to investors, while other locations have no such prohibition.

The process determines as to whether the publication of the multimedia content not allowed by at least one regulation to an identified audience in an at least one of the identified potential locations (decision 650). If the publication is not allowed, then decision 650 branches to the 'yes' branch to perform steps 660 and 670. On the other hand, if this publication is allowed to the identified potential audience(s) in all of the identified potential locations, then decision 650 branches to the 'no' branch bypassing steps 660 and 670 with processing returning to the calling routine (see FIG. 5) at 680.

When the result of decision 650 is to not allow publication of the multimedia content, then steps 660 and 670 are performed. At step 660, the process sets the Boolean variable (allow_Publs) to 'NO' or 'FALSE' indicating that the process is to inhibit publication of the multimedia content. At step 670, the process retains any reason(s) for publication denial, for example the regulation, potential audience, and location that caused the denial of the request by decision 650. The reasons are retained in memory area 545. FIG. 6 processing thereafter returns to the calling routine (see FIG. 5) at 680.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system that includes a processor and a memory accessible by the processor, the method comprising:
    receiving a multimedia publish request from a provider, wherein the multimedia publish request includes a multimedia content;
    extracting, by a trained artificial intelligence (AI) system, a set of metadata from the received multimedia content, wherein the extracting includes performing an image analysis on the multimedia content to identify one or more images in the multimedia content that correspond to one or more images learned by the AI system;
    analyzing the set of metadata, wherein the analyzing identifies a predicted audience and a predicted location, and wherein the predicted location is based on the identified one or more images in the multimedia content, and wherein the analyzing results in a set of regulations that correspond to the multimedia content, wherein the set of regulations are based on the predicted audience, the predicted location, and the provider;
    comparing the set of metadata to the set of regulations; and
    publishing the multimedia content in response to the comparison revealing that the multimedia content is in compliance with the set of regulations.

2. The method of claim 1 wherein the provider is an author of the multimedia content and wherein an identification of the author is based on the analysis of the set of metadata.

3. The method of claim 1, further comprising inhibiting the publication of the multimedia content in response to the comparison revealing that the multimedia content fails to comply with the set of regulations.

4. An information handling system comprising:
    one or more processors;
    a memory coupled to at least one of the processors; and
    a set of computer program instructions stored in the memory and executed by at least one of the processors in order to perform actions comprising:
        receiving a multimedia publish request from a provider, wherein the multimedia publish request includes a multimedia content;
        extracting, by a trained artificial intelligence (AI) system, a set of metadata from the received multimedia content, wherein the extracting includes performing an image analysis on the multimedia content to identify one or more images in the multimedia content that correspond to one or more images learned by the AI system;
        analyzing the set of metadata, wherein the analyzing identifies a predicted audience and a predicted location, and wherein the predicted location is based on the identified one or more images in the multimedia content, and wherein the analyzing results in a set of regulations that apply to the multimedia content, wherein the set of regulations are based on the predicted audience, the predicted location, and the provider;
        comparing the set of metadata to the set of regulations; and
        publishing the multimedia content in response to the comparison revealing that the multimedia content is in compliance with the set of regulations.

5. The information handling system of claim 4 wherein the provider is an author of the multimedia content and wherein an identification of the author is based on the analysis of the set of metadata.

6. The information handling system of claim 4, wherein the actions further comprise inhibiting the publication of the multimedia content in response to the comparison revealing that the multimedia content fails to comply with the set of regulations.

7. A computer program product stored in a computer readable storage medium, comprising computer program code that, when executed by an information handling system, performs actions comprising:
    receiving a multimedia publish request from a provider, wherein the multimedia publish request includes a multimedia content;
    extracting, by a trained artificial intelligence (AI) system, a set of metadata from the received multimedia content, wherein the extracting includes performing an image analysis on the multimedia content to identify one or more images in the multimedia content that correspond to one or more images learned by the AI system;
    analyzing the set of metadata, wherein the analyzing identifies a predicted audience and a predicted location, and wherein the predicted location is based on the identified one or more images in the multimedia content, and wherein the analyzing results in a set of regulations that apply to the multimedia content, wherein the set of regulations are based on the predicted audience, the predicted location, and the provider;
    comparing the set of metadata to the set of regulations; and
    publishing the multimedia content in response to the comparison revealing that the multimedia content is in compliance with the set of regulations.

8. The computer program product of claim 7 wherein the provider is an author of the multimedia content and wherein an identification of the author is based on the analysis of the set of metadata.

9. The computer program product of claim 7, wherein the actions further comprise inhibiting the publication of the multimedia content in response to the comparison revealing that the multimedia content fails to comply with the set of regulations.

* * * * *